US008895636B2

(12) United States Patent
Kampf

(10) Patent No.: US 8,895,636 B2
(45) Date of Patent: Nov. 25, 2014

(54) PRODUCING RIGID POLYURETHANE FOAMS AND RIGID POLYISOCYANURATE FOAMS

(71) Applicant: BASF SE, Ludwigshafen (DE)

(72) Inventor: Gunnar Kampf, Stemwede-Haldem (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/731,317

(22) Filed: Dec. 31, 2012

(65) Prior Publication Data

US 2013/0190419 A1  Jul. 25, 2013

Related U.S. Application Data

(60) Provisional application No. 61/582,419, filed on Jan. 2, 2012, provisional application No. 61/614,535, filed on Mar. 23, 2012.

(51) Int. Cl.

| C08G 18/00 | (2006.01) |
| C08G 18/40 | (2006.01) |
| C08G 18/76 | (2006.01) |
| C08G 18/34 | (2006.01) |
| C08G 18/22 | (2006.01) |
| C08G 18/42 | (2006.01) |
| C08G 101/00 | (2006.01) |

(52) U.S. Cl.
CPC ............ *C08G 18/34* (2013.01); *C08G 18/4018* (2013.01); *C08G 18/7664* (2013.01); *C08G 2101/0025* (2013.01); *C08G 18/225* (2013.01); *C08G 18/4288* (2013.01); *C08G 2105/02* (2013.01)
USPC ............ 521/173; 521/155; 521/157; 521/172

(58) Field of Classification Search
CPC ................. C08G 2101/005; C08G 2101/0083; C08G 18/4018; C08G 18/4219; C08G 18/4288
USPC ................... 521/155, 157, 172, 173
See application file for complete search history.

(56) References Cited

U.S. PATENT DOCUMENTS

| 3,138,562 | A |   | 6/1964  | Nischk et al. |
| 5,051,528 | A |   | 9/1991  | Naujokas et al. |
| 5,877,255 | A | * | 3/1999  | Gerber et al. ................. 524/590 |
| 5,922,779 | A | * | 7/1999  | Hickey ......................... 521/114 |
| 6,359,022 | B1| * | 3/2002  | Hickey et al. ................. 521/114 |
| 6,664,363 | B1| * | 12/2003 | Faunce ....................... 528/295.5 |
| 2008/0114086 | A1 | * | 5/2008 | Lorenz et al. ................. 521/88 |
| 2008/0234402 | A1 |   | 9/2008 | Lehmann et al. |
| 2011/0218262 | A1 |   | 9/2011 | Eling et al. |
| 2011/0263736 | A1 |   | 10/2011 | Kösters et al. |
| 2012/0125562 | A1 |   | 5/2012 | Mohmeyer et al. |
| 2012/0142799 | A1 |   | 6/2012 | Gehringer et al. |
| 2012/0214891 | A1 |   | 8/2012 | Gehringer et al. |
| 2012/0214892 | A1 |   | 8/2012 | Kunst et al. |
| 2012/0244303 | A1 |   | 9/2012 | Tomasi et al. |
| 2012/0264841 | A1 |   | 10/2012 | Tomovic et al. |
| 2012/0264842 | A1 |   | 10/2012 | Tomovic et al. |

FOREIGN PATENT DOCUMENTS

| DE | 1 003 714 | 3/1957 |
| DE | 10 2005 041 763 A1 | 3/2007 |
| EP | 1 058 701 | 12/2000 |
| GB | 1032233 | 6/1966 |
| WO | WO 99/42508 A1 | 8/1999 |
| WO | WO 2010/043624 A2 | 4/2010 |
| WO | WO 2011/107374 A1 | 9/2011 |
| WO | WO 2011/131682 A1 | 10/2011 |
| WO | WO 2012/066038 A2 | 5/2012 |
| WO | WO 2012/072540 A1 | 6/2012 |
| WO | WO 2012/110585 A1 | 8/2012 |
| WO | WO 2012/113737 A1 | 8/2012 |
| WO | WO 2012/126916 A2 | 9/2012 |
| WO | WO 2012/140025 A1 | 10/2012 |
| WO | WO 2012/140150 A1 | 10/2012 |
| WO | WO 2013/102540 A1 | 7/2013 |

OTHER PUBLICATIONS

U.S. Appl. No. 14/034,745, filed Sep. 24, 2013, Kampf, et al.
U.S. Appl. No. 14/176,366, filed Feb. 10, 2014, Jacobmeier, et al.
U.S. Appl. No. 14/210,824, filed Mar. 14, 2014, Jacobmeier, et al.
Extended European Search Report Issued May 21, 2012 in Patent Application No. 12150016.9 (with English translation of Categories of Cited Documents).
Kunststoff-Handbuch et al., "Polyurethane", Carl Hanser Verlag München, vol. VII, 1966, 5 pages (index).
Kunstsoff Handbuch et al., "Polyurethane", Carl Hanser Verlag München, vol. 7, 1983, 5 pages (index).
Kunststoff Handbuch at al., "Polyurethane", Carl Hanser Verlag München, vol. 7, 1993, 5 pages (index).

* cited by examiner

*Primary Examiner* — Michael L Leonard
(74) *Attorney, Agent, or Firm* — Oblon, Spivak, McClelland, Maier & Neustadt, L.L.P.

(57) ABSTRACT

Rigid polyurethane foams or rigid polyisocyanurate foams with low brittleness are produced by the reaction of polyisocyanate polyetherester polyols based on aromatic dicarboxylic acids obtained by esterification of a dicarboxylic acid composition containing aromatic dicarboxylic acids and aliphatic dicarboxylic acids, fatty acids, aliphatic or cycloaliphatic diols having 2 to 18 carbon atoms or alkoxylates thereof, and a polyether polyol having a functionality of not less than 2.

16 Claims, No Drawings

PRODUCING RIGID POLYURETHANE FOAMS AND RIGID POLYISOCYANURATE FOAMS

The present invention relates to a process for producing rigid polyurethane foams or rigid polyisocyanurate foams using certain polyetherester polyols based on aromatic dicarboxylic acids. The present invention also relates to the rigid foams thus obtainable and also to their use for producing sandwich elements having rigid or flexible outer layers. The present invention further relates to the underlying polyol components.

The production of rigid polyurethane foams by reacting organic or modified organic di- or polyisocyanates with comparatively high molecular weight compounds having two or more than two reactive hydrogen atoms, especially with polyether polyols from alkylene oxide polymerization or polyester polyols from the polycondensation of alcohols with dicarboxylic acids in the presence of polyurethane catalysts, chain-extending and/or crosslinking agents, blowing agents and further auxiliary and admixture agents is known and has been described in numerous patent and literature publications.

In the context of the present disclosure, the terms "polyester polyol", "polyesterol", "polyester alcohol" and the abbreviation "PESOL" are used interchangeably.

Customary polyester polyols are polycondensates of aromatic and/or aliphatic dicarboxylic acids and alkanediols and/or -triols, or ether diols. However it is also possible to process polyester scrap, especially polyethylene terephthalate (PET) and/or polybutylene terephthalate (PBT) scrap. A whole series of processes are known and have been described for this purpose. Some processes are based on converting the polyester into a diester of terephthalic acid, for example dimethyl terephthalate. DE-A 100 37 14 and U.S. Pat. No. 5,051,528 describe such transesterifications using methanol and transesterification catalysts.

It is also known that esters based on terephthalic acid are superior to esters based on phthalic acid in terms of burning behavior, as described in WO 2010/043624 for example.

When polyester polyols based on aromatic carboxylic acids or derivatives thereof (such as terephthalic acid or phthalic anhydride) are used to produce rigid polyurethane (PU) foams, the high viscosity of the polyester polyols often has a noticeably adverse effect, since the viscosity of blends with the polyesters rises as a result, which makes mixing with the isocyanate distinctly more difficult.

EP-A 1 058 701 discloses aromatic polyester polyols of low viscosity, which are obtained by transesterifying a mixture of phthalic acid derivatives, diols, polyols and hydrophobic fat-based materials.

In addition, certain systems for producing rigid PU foams, for example those employing glycerol as comparatively high-functionality alcoholic polyester component, can give rise to problems due to insufficient dimensional stability in that the foamed product distorts significantly after demolding or after the pressure section when processed by the double belt process.

Nor has the problem with the behavior of rigid PU foams in the event of fire hitherto been satisfactorily solved for all systems. For example, a toxic compound can form in the event of fire when using trimethylolpropane (TMP) as comparatively high-functionality alcoholic polyester component.

A general problem with the production of rigid foams is the formation of surface defects, preferentially at the interface with metallic outer layers. These foam surface defects cause formation of an uneven metal surface in sandwich elements and thus often lead to visual unacceptability of the product. An improvement in the foam surface reduces the frequency with which such surface defects occur and thus leads to a visual improvement in the surface of sandwich elements.

Rigid polyurethane foams frequently display high brittleness on cutting with severe evolution of dust and high sensitivity on the part of the foam, and also on sawing where particularly the sawing of composite elements with metallic outer layers and a core of polyisocyanurate foam can lead to crack formation in the foam.

It is further generally desirable to provide systems having a very high self-reactivity in order that the use of catalysts may be minimized.

It is an object of the invention to provide polyester polyols based on aromatic dicarboxylic acids for the production of rigid PU foams with low brittleness. A further object of the invention is to provide a polyol component which comprises the polyester polyols and has a high self-reactivity.

Further objects, moreover, were to improve, or at least not to impair, the dimensional tolerance of the PU end products, and also to reduce, or at least not to worsen, the formation of toxic compounds in the event of fire. Moreover, an intention was to enhance the processing properties in relation to the development of surface defects.

Furthermore, an aim is for the polyester polyols to have a low viscosity, in order to allow them to be readily metered and mixed during the production of the rigid PU foams. The solubility of blowing agents, such as of pentane, for example, in the polyol component ought also to be extremely good.

This object is achieved by a process for producing rigid polyurethane foams or rigid polyisocyanurate foams comprising the reaction of A) at least one polyisocyanate,
B) at least one polyetherester polyol obtainable by esterification of
   b1) 10 to 70 mol % of a dicarboxylic acid composition comprising
      b11) 50 to 100 mol %, based on the dicarboxylic acid composition, of one or more aromatic dicarboxylic acids or derivatives thereof,
      b12) 0 to 50 mol %, based on said dicarboxylic acid composition b1), of one or more aliphatic dicarboxylic acids or derivatives thereof,
   b2) 2 to 30 mol % of one or more fatty acids and/or fatty acid derivatives,
   b3) 10 to 70 mol % of one or more aliphatic or cycloaliphatic diols having 2 to 18 carbon atoms or alkoxylates thereof,
   b4) 2 to 50 mol % of a polyether polyol having a functionality of not less than 2, prepared by alkoxylating a polyol having a functionality of above 2,
   all based on the total amount of components b1) to b4), wherein said components b1) to b4) sum to 100 mol %,
C) optionally further polyester polyols other than those of component B),
D) at least one polyether polyol, and
E) optionally flame retardants,
F) one or more blowing agents,
G) catalysts, and
H) optionally further auxiliaries or admixture agents,
wherein the mass ratio of total components B) and optionally C) to component D) is at least 7.

The present invention also provides a polyol component comprising the aforementioned components B) to H), wherein the mass ratio of total components B) and optionally C) to component D) is at least 7.

The present invention further provides rigid polyurethane and rigid polyisocyanurate foams obtainable from the process of the present invention, and their use for producing sandwich elements having rigid or flexible outer layers.

The invention will now be more particularly described. Combinations of preferred embodiments are not outside the scope of the present invention. This applies particularly in respect of those embodiments of the individual components A) to H) of the present invention that are characterized as preferred. The embodiments recited hereinbelow in the context of components B) to H) relate not only to the process of the present invention and the rigid foams thus obtainable but also to the polyol components of the present invention.

Component B

In the context of the present disclosure, the terms "polyester polyol" and "polyesterol" are used interchangeably as are the terms "polyether polyol" and "polyetherol".

Component b11) preferably comprises at least one compound selected from the group consisting of terephthalic acid, dimethyl terephthalate (DMT), polyethylene terephthalate (PET), phthalic acid, phthalic anhydride (PA) and isophthalic acid. It is particularly preferable for component b11) to comprise at least one compound from the group consisting of terephthalic acid, dimethyl terephthalate (DMT), polyethylene terephthalate (PET) and phthalic anhydride (PA). It is very particularly preferable for component b11) to comprise phthalic anhydride, dimethyl terephthalate (DMT), terephthalic acid or mixtures thereof. The component b11) aromatic dicarboxylic acids or derivatives thereof are more preferably selected from the aforementioned aromatic dicarboxylic acids and dicarboxylic acid derivatives respectively and specifically from terephthalic acid and/or dimethyl terephthalate (DMT). Terephthalic acid and/or DMT in component b11) leads to polyether esters B) having particularly good fire protection properties. Terephthalic acid is very particularly preferable since, in contrast to DMT, the formation of disruptive elimination products can be avoided.

In general, aliphatic dicarboxylic acids or derivatives (component b12)) are comprised in the dicarboxylic acid composition b1) at 0 to 30 mol %, preferably 0 to 10 mol %. It is particularly preferable for the dicarboxylic acid composition b1) to comprise no aliphatic dicarboxylic acids or derivatives thereof and thus to consist, to 100 mol %, of one or more aromatic dicarboxylic acids or derivatives thereof, the aforementioned being preferred.

The component b2) is preferably used in amounts of 3 to 20 mol %, more preferably 5 to 18 mol %.

The component b3) is preferably used in amounts of 20 to 60 mol %, preferably in the range from 25 to 55 mol %, more preferably in the range from 30 to 45 mol %.

The component b4) is preferably used in amounts of 2 to 40 mol %, preferably 8 to 35 mol %, more preferably 15 to 25 mol %.

In one embodiment of the invention, the fatty acid or fatty acid derivative b2) consists of a fatty acid or fatty acid mixture, one or more glycerol esters of fatty acids or of fatty acid mixtures, and/or one or more fatty acid monoesters, for example biodiesel or methyl esters of fatty acids, and it is particularly preferable for component b2) to consist of a fatty acid or fatty acid mixture and/or one or more fatty acid monoesters; more specifically component b2) consists of a fatty acid or fatty acid mixture and/or biodiesel, and component b2) specifically consists of a fatty acid or fatty acid mixture.

In one preferred embodiment of the invention, the fatty acid or fatty acid derivative b2) is selected from the group consisting of castor oil, polyhydroxy fatty acids, ricinoleic acid, hydroxyl-modified oils, grapeseed oil, black cumin oil, pumpkin kernel oil, borage seed oil, soybean oil, wheat germ oil, rapeseed oil, sunflower seed oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, animal tallow, for example beef dripping, fatty acids, hydroxyl-modified fatty acids, biodiesel, methyl esters of fatty acids and fatty acid esters based on myristoleic acid, palmitoleic acid, oleic acid, vaccenic acid, petroselic acid, gadoleic acid, erucic acid, nervonic acid, linoleic acid, α- and γ-linolenic acid, stearidonic acid, arachidonic acid, timnodonic acid, clupanodonic acid and cervonic acid, and mixed fatty acids.

In a particularly preferred embodiment of the present invention, the fatty acid or fatty acid derivative b2) is oleic acid, biodiesel, soybean oil, rapeseed oil or tallow, particularly preferably oleic acid, biodiesel, soybean oil, rapeseed oil or beef dripping, more specifically oleic acid or biodiesel and most specifically oleic acid. The fatty acid or the fatty acid derivative improves, inter alia, the blowing agent solubility in the production of rigid polyurethane foams.

It is very particularly preferable for component b2) not to comprise any triglyceride, especially no oil or fat. The glycerol released from the triglyceride by esterification/transesterification has an adverse effect on the dimensional stability of the rigid foam, as mentioned above. Preferred fatty acids and fatty acid derivatives in the context of component b2) are therefore the fatty acids themselves and also alkyl monoesters of fatty acids or alkyl monoesters of fatty acid mixtures, especially the fatty acids themselves and/or biodiesel.

Preferably, the aliphatic or cycloaliphatic diol b3) is selected from the group consisting of ethylene glycol, diethylene glycol, propylene glycol, 1,3-propanediol, 1,4-butanediol, 1,5-pentanediol, 1,6-hexanediol, 2-methyl-1,3-propanediol and 3-methyl-1,5-pentanediol and alkoxylates thereof. It is particularly preferable for the aliphatic diol b3) to be monoethylene glycol or diethylene glycol, especially diethylene glycol.

Component b4) can in particular be prepared using potassium hydroxide or an amine as catalyst. However, the use of KOH requires an additional work-up step. In one preferred embodiment of the present invention, the amine catalyst for preparing component b4) is selected from the group comprising dimethylethanolamine (DMEOA), imidazole and imidazole derivatives and also mixtures thereof, more preferably imidazole.

Preferably, such a polyether polyol b4) having a functionality above 2 is used, which was prepared by alkoxylating a polyol having a functionality of not less than 3.

According to the invention, the polyether polyol b4) has a functionality greater than 2. It preferably has a functionality of not less than 2.7 and especially of not less than 2.9. In general, it has a functionality of not more than 6, preferably not more than 5 and more preferably not more than 4.

The polyether polyol b4) is preferably selected from the group consisting of the reaction products of sorbitol, polyglycerol, glycerol, trimethylolpropane (TMP), pentaerythritol or mixtures thereof with an alkylene oxide.

In one embodiment of the present invention, the polyether polyol b4) is obtainable by reacting a polyol having a functionality of greater than 2 with ethylene oxide and/or propylene oxide, preferably with ethylene oxide. It is particularly preferable for the polyether polyol b4) to be obtainable by alkoxylation with ethylene oxide, leading to rigid polyurethane foams having improved fire protection properties.

Preferably, the polyether polyol b4) is obtainable by alkoxylating, preferably ethoxylating, a polyol selected from the group consisting of sorbitol, pentaerythritol, trimethylolpropane, glycerol, polyglycerol and mixtures thereof, and more preferably a polyol selected from the group consisting of trimethylolpropane and glycerol.

In a specific embodiment of the invention, the polyether polyol b4) consists of the reaction product of glycerol with ethylene oxide and/or propylene oxide, preferably with ethylene oxide. This results in a particularly high storage stability for component B.

In a further specific embodiment of the invention, the polyether polyol b4) consists of the reaction product of trimethylolpropane with ethylene oxide and/or propylene oxide, preferably with ethylene oxide. This likewise results in a particularly high storage stability for component B).

Preferably, the polyether polyol b4) has an OH number in the range from 150 to 1250 mg KOH/g, preferably from 300 to 950 mg KOH/g, particularly preferably from 500 to 800 mg KOH/g. In this range, particularly favorable mechanical properties and also fire protection properties are obtainable.

Preferably, at least 200 mmol, more preferably at least 400 mmol, even more preferably at least 600 mmol, yet even more preferably at least 800 mmol and yet still even more preferably at least 1000 mmol of component b4) are used per kg of polyetherester polyol B).

In a particularly preferred embodiment of the invention, the polyether polyol b4) consists of the reaction product of trimethylolpropane or glycerol, preferably glycerol, with ethylene oxide, wherein the OH number of polyether polyol b4) is in the range from 500 to 800 mg KOH/g and preferably from 500 to 650 mg KOH/g.

In an especially preferred embodiment of the invention, the polyether polyol b4) consists of the reaction product of trimethylolpropane or glycerol, preferably glycerol, with ethylene oxide, wherein the OH number of polyether polyol b4) is in the range from 500 to 800 mg KOH/g and preferably from 500 to 650 mg KOH/g, the aliphatic or cycloaliphatic diol b3) is diethylene glycol, and the fatty acid or fatty acid derivative b2) is oleic acid.

The number-weighted average functionality of polyetherester polyol B) is preferably not less than 2, more preferably greater than 2, even more preferably greater than 2.2 and especially greater than 2.3, which leads to a higher crosslink density on the part of the polyurethane produced therewith and hence to better mechanical properties on the part of the polyurethane foam.

To prepare the polyetherester polyols, the aliphatic and aromatic polycarboxylic acids and/or derivatives and polyhydric alcohols can be polycondensed in the absence of catalysts or preferably in the presence of esterification catalysts, advantageously in an atmosphere of inert gas, e.g. nitrogen, in the melt at temperatures of from 150 to 280° C., preferably from 180 to 260° C., optionally under reduced pressure, to the desired acid number which is advantageously less than 10, preferably less than 2. In a preferred embodiment, the esterification mixture is polycondensed at the abovementioned temperatures to an acid number of from 80 to 20, preferably from 40 to 20, under atmospheric pressure and subsequently under a pressure of less than 500 mbar, preferably from 40 to 400 mbar. Possible esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as, e.g., benzene, toluene, xylene or chlorobenzene in order to distill off the water of condensation as an azeotrope.

To prepare the polyetherester polyols, the organic polycarboxylic acids and/or derivatives and polyhydric alcohols are advantageously polycondensed in a molar ratio of 1:1-2.2, preferably 1:1.05-2.1 and particularly preferably 1:1.1-2.0.

The polyetherester polyols obtained generally have a number-average molecular weight in the range from 300 to 3000, preferably in the range from 400 to 1000 and especially in the range from 450 to 800.

The proportion of polyetherester polyols B) according to the present invention is generally at least 10 wt %, preferably at least 20 wt %, more preferably at least 40 wt % and even more preferably at least 50 wt %, based on total components B) to H).

To produce the rigid polyurethane foams by the process of the invention, use is made of, in addition to the above-described specific polyester polyols (polyetherester polyols B), the constructional components which are known per se, about which the following details may be provided.

Component A

A polyisocyanate for the purposes of the present invention is an organic compound comprising two or more than two reactive isocyanate groups per molecule, i.e., the functionality is not less than 2. When the polyisocyanates used or a mixture of two or more polyisocyanates do not have a unitary functionality, the number-weighted average functionality of component A) used will be not less than 2.

Useful polyisocyanates A) include the aliphatic, cycloaliphatic, araliphatic and preferably aromatic polyfunctional isocyanates which are known per se. Polyfunctional isocyanates of this type are known per se or are obtainable by methods known per se. Polyfunctional isocyanates can more particularly also be used as mixtures, in which case component A) comprises various polyfunctional isocyanates. The number of isocyanate groups per molecule in polyfunctional isocyanates useful as polyisocyanate is two (and so the polyfunctional isocyanates in question are referred to hereinbelow as diisocyanates) or more than two.

Particularly the following may be mentioned in detail: alkylene diisocyanates having 4 to 12 carbon atoms in the alkylene radical, such as 1,12-dodecane diisocyanate, 2-ethyltetramethylene 1,4-diisocyanate, 2-methylpentamethylene 1,5-diisocyanate, tetramethylene 1,4-diisocyanate, and preferably hexamethylene 1,6-diisocyanate; cycloaliphatic diisocyanates such as cyclohexane 1,3- and 1,4-diisocyanate and also any desired mixtures of these isomers, 1-isocyanato-3,3,5-trimethyl-5-isocyanatomethylcyclohexane (IPDI), 2,4- and 2,6-hexahydrotolylene diisocyanate and also the corresponding isomeric mixtures, 4,4'-, 2,2'- and 2,4'-dicyclohexylmethane diisocyanate and also the corresponding isomeric mixtures, and preferably aromatic polyisocyanates, such as 2,4- and 2,6-tolylene diisocyanate and the corresponding isomeric mixtures, 4,4'-, 2,4'- and 2,2'-diphenylmethane diisocyanate and the corresponding isomeric mixtures, mixtures of 4,4'- and 2,2'-diphenylmethane diisocyanates, polyphenylpolymethylene polyisocyanates, mixtures of 4,4'-, 2,4'- and 2,2'-diphenylmethane diisocyanates and polyphenylpolymethylene polyisocyanates (crude MDI) and mixtures of crude MDI and tolylene diisocyanates.

Of particular suitability are 2,2'-, 2,4'- and/or 4,4'-diphenylmethane diisocyanate (MDI), 1,5-naphthylene diisocyanate (NDI), 2,4- and/or 2,6-tolylene diisocyanate (TDI), 3,3'-dimethylbiphenyl diisocyanate, 1,2-diphenylethane diisocyanate and/or p-phenylene diisocyanate (PPDI), tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5- isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or -2,6-cyclohexane diisocyanate and 4,4'-, 2,4'- and/or 2,2'-dicyclohexylmethane diisocyanate.

Frequent use is also made of modified polyisocyanates, i.e. products obtained by chemical conversion of organic polyisocyanates and having two or more than two reactive isocyanate groups per molecule. Polyisocyanates comprising ester, urea, biuret, allophanate, carbodiimide, isocyanurate, uretdione, carbamate and/or urethane groups may be mentioned in particular.

The following embodiments are particularly preferable as polyisocyanates of component A):
  i) polyfunctional isocyanates based on tolylene diisocyanate (TDI), especially 2,4-TDI or 2,6-TDI or mixtures of 2,4- and 2,6-TDI;
  ii) polyfunctional isocyanates based on diphenylmethane diisocyanate (MDI), especially 2,2'-MDI or 2,4'-MDI or 4,4'-MDI or oligomeric MDI, which is also known as polyphenylpolymethylene isocyanate, or mixtures of two or three aforementioned diphenylmethane diisocyanates, or crude MDI, which is obtained in the production of MDI, or mixtures of at least one oligomer of MDI and at least one aforementioned low molecular weight MDI derivative;
  iii) mixtures of at least one aromatic isocyanate as per embodiment i) and at least one aromatic isocyanate as per embodiment ii).

Polymeric diphenylmethane diisocyanate is very particularly preferred as polyisocyanate. Polymeric diphenylmethane diisocyanate (called polymeric MDI hereinbelow) is a mixture of binuclear MDI and oligomeric condensation products and thus derivatives of diphenylmethane diisocyanate (MDI). Polyisocyanates may preferably also be constructed from mixtures of monomeric aromatic diisocyanates and polymeric MDI.

Polymeric MDI, in addition to binuclear MDI, comprises one or more polynuclear condensation products of MDI with a functionality of more than 2, especially 3 or 4 or 5. Polymeric MDI is known and often referred to as polyphenylpolymethylene isocyanate or else as oligomeric MDI. Polymeric MDI is typically constructed from a mixture of MDI-based isocyanates of differing functionality. Polymeric MDI is typically used in admixture with monomeric MDI.

The (average) functionality of a polyisocyanate comprising polymeric MDI can vary in the range from about 2.2 to about 5, especially from 2.3 to 4, especially from 2.4 to 3.5. Crude MDI, obtained as an intermediate in the production of MDI, is more particularly such a mixture of MDI-based polyfunctional isocyanates having different functionalities.

Polyfunctional isocyanates or mixtures of two or more polyfunctional isocyanates based on MDI are known and available for example from BASF Polyurethanes GmbH under the name of Lupranat®.

The functionality of component A) is preferably at least two, especially at least 2.2 and more preferably at least 2.4. The functionality of component A) is preferably from 2.2 to 4 and more preferably from 2.4 to 3.

The isocyanate group content of component A) is preferably from 5 to 10 mmol/g, especially from 6 to 9 mmol/g and more preferably from 7 to 8.5 mmol/g. A person skilled in the art is aware of a reciprocal relationship between the isocyanate group content in mmol/g and the so-called equivalence weight in g/equivalent. The isocyanate group content in mmol/g is obtained from the content in wt % according to ASTM D-5155-96 A.

In a particularly preferred embodiment, component A) consists of at least one polyfunctional isocyanate selected from diphenylmethane 4,4'-diisocyanate, diphenylmethane 2,4'-diisocyanate, diphenylmethane 2,2'-diisocyanate and oligomeric diphenylmethane diisocyanate. In this preferred embodiment, component (a1) more preferably comprises oligomeric diphenylmethane diisocyanate and has a functionality of at least 2.4.

The viscosity of component A) used can vary within wide limits. The viscosity of component A) is preferably in the range from 100 to 3000 mPa·s and more preferably in the range from 200 to 2500 mPa·s.

Component C

Suitable polyester polyols C) differ from polyetherester polyols B) and can be prepared, for example, from organic dicarboxylic acids having 2 to 12 carbon atoms, preferably aromatic ones, or mixtures of aromatic and aliphatic dicarboxylic acids, and polyhydric alcohols, preferably diols, having 2 to 12 carbon atoms and preferably 2 to 6 carbon atoms.

Possible dicarboxylic acids are, in particular: succinic acid, glutaric acid, adipic acid, suberic acid, azelaic acid, sebacic acid, decanedicarboxylic acid, maleic acid, fumaric acid, phthalic acid, isophthalic acid and terephthalic acid. It is likewise possible to use derivatives of these dicarboxylic acids, such as dimethyl terephthalate, for example. The dicarboxylic acids can be used either individually or in admixture with one another. It is also possible to use the corresponding dicarboxylic acid derivatives, e.g. dicarboxylic esters of alcohols having from 1 to 4 carbon atoms or dicarboxylic anhydrides, in place of the free dicarboxylic acids. As aromatic dicarboxylic acids, preference is given to using phthalic acid, phthalic anhydride, terephthalic acid and/or isophthalic acid as a mixture or alone. As aliphatic dicarboxylic acids, preference is given to using dicarboxylic acid mixtures of succinic, glutaric and adipic acid in weight ratios of, for example, 20-35:35-50:20-32 parts by weight and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol, trimethylolpropane and pentaerythritol. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentanediol and 1,6-hexanediol. It is also possible to use polyester polyols derived from lactones, e.g., ε-caprolactone, or hydroxycarboxylic acids, e.g., ω-hydroxycaproic acid.

To prepare the further polyester polyols C), biobased starting materials and/or derivatives thereof are also suitable, for example castor oil, polyhydroxy fatty acids, ricinoleic acid, hydroxyl-modified oils, grapeseed oil, black cumin oil, pumpkin kernel oil, borage seed oil, soybean oil, wheat germ oil, rapeseed oil, sunflower seed oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, fatty acids, hydroxyl-modified fatty acids and fatty acid esters based on myristoleic acid, palmitoleic acid, oleic acid, vaccenic acid, petroselic acid, gadoleic acid, erucic acid, nervonic acid, linoleic acid, α- and γ-linolenic acid, stearidonic acid, arachidonic acid, timnodonic acid, clupanodonic acid and cervonic acid.

The mass ratio of polyetherester polyols B) to polyester polyols C) is generally at least 0.1, preferably at least 0.25, more preferably at least 0.5 and especially at least 0.8.

One especially preferred embodiment does not utilize any further polyester polyols C).

Component D

One or more polyether polyols D) are used, according to the present invention, as component D). Polyetherols D) can be prepared by known methods, for example by anionic polymerization of one or more alkylene oxides having from 2 to 4 carbon atoms using alkali metal hydroxides, e.g., sodium or potassium hydroxide, or alkali metal alkoxides, e.g., sodium methoxide, sodium or potassium ethoxide or potassium isopropoxide, or aminic alkoxylation catalysts, such as dimethylethanolamine (DMEOA), imidazole and/or imidazole derivatives, with use of at least one starter molecule comprising from 2 to 8, preferably from 2 to 6, reactive hydrogen atoms in bonded form, or by cationic polymerization using Lewis acids, e.g., antimony pentachloride, boron fluoride etherate, or bleaching earth.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Preferred alkylene oxides are propylene oxide and ethylene oxide, with particular preference being given to ethylene oxide.

Possible starter molecules are, for example: water, organic dicarboxylic acids, such as succinic acid, adipic acid, phthalic acid and terephthalic acid, aliphatic and aromatic, optionally N-monoalkyl-, N,N-dialkyl- and N,N'-dialkyl-substituted diamines having from 1 to 4 carbon atoms in the alkyl radical, e.g. optionally monoalkyl- and dialkyl-substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane. Particular preference is given to the recited diprimary amines, for example ethylenediamine.

Further possible starter molecules are: alkanolamines such as ethanolamine, N-methylethanolamine and N-ethylethanolamine, dialkanolamines, such as diethanolamine, N-methyldiethanolamine and N-ethyldiethanolamine and trialkanolamines, e.g., triethanolamine, and ammonia.

Preference is given to using dihydric or polyhydric alcohols, e.g., ethanediol, 1,2- and 1,3-propanediol, diethylene glycol (DEG), dipropylene glycol, 1,4-butanediol, 1,6-hexanediol, glycerol, trimethylolpropane, pentaerythritol, sorbitol and sucrose.

Polyether polyols D), preferably polyoxypropylene polyols and polyoxyethylene polyols, more preferably polyoxyethylene polyols, have a functionality of preferably 2 to 6, more preferably 2 to 4, especially 2 to 3 and specifically 2 and number-average molecular weights of 150 to 3000 g/mol, preferably 200 to 2000 g/mol and especially 250 to 1000 g/mol. One preferred embodiment of the invention utilizes an alkoxylated diol, preferably an ethoxylated diol, for example ethoxylated ethylene glycol, as polyether polyol D), preferably polyethylene glycol is concerned.

In a specific embodiment of the invention, the polyetherol component D) consists exclusively of polyethylene glycol, preferably with a number-average molecular weight of 250 to 1000 g/mol.

The proportion of polyether polyols D) is generally in the range from 0 to 11 wt %, preferably in the range from 2 to 9 wt % and more preferably in the range from 4 to 8 wt %, based on total components B) to H).

The mass ratio of total components B) and C) to component D) in accordance with the present invention is greater than 7, preferably greater than 7.5, more preferably greater than 8, even more preferably greater than 10 and yet even more preferably greater than 12.

The mass ratio of total components B) and C) to component D) in accordance with the present invention is further less than 80, preferably less than 40, more preferably less than 30, even more preferably less than 20, yet even more preferably less than 16 and yet still even more preferably less than 14.

Component E

As flame retardants E), it is generally possible to use the flame retardants known from the prior art. Suitable flame retardants are, for example, brominated esters, brominated ethers (Ixol) or brominated alcohols such as dibromoneopentyl alcohol, tribromoneopentyl alcohol and PHT-4-diol and also chlorinated phosphates such as tris(2-chloroethyl) phosphate, tris(2-chloropropyl) phosphate (TCPP), tris(1,3-dichloropropyl) phosphate, tricresyl phosphate, tris(2,3-dibromopropyl) phosphate, tetrakis(2-chloroethyl) ethylenediphosphate, dimethyl methanephosphonate, diethyl diethanolaminomethylphosphonate and also commercial halogen-comprising flame retardant polyols. By way of further phosphates or phosphonates it is possible to use diethyl ethanephosphonate (DEEP), triethyl phosphate (TEP), dimethyl propylphosphonate (DMPP) or diphenyl cresyl phosphate (DPK) as liquid flame retardants.

Apart from the abovementioned flame retardants, it is also possible to use inorganic or organic flame retardants such as red phosphorus, preparations comprising red phosphorus, aluminum oxide hydrate, antimony trioxide, arsenic oxide, ammonium polyphosphate and calcium sulfate, expandable graphite or cyanuric acid derivatives such as melamine, or mixtures of at least two flame retardants, e.g. ammonium polyphosphates and melamine and optionally maize starch or ammonium polyphosphate, melamine, expandable graphite and optionally aromatic polyesters for making the rigid polyurethane foams flame resistant.

Preferable flame retardants have no isocyanate-reactive groups. The flame retardants are preferably liquid at room temperature. Particular preference is given to TCPP, DEEP, TEP, DMPP and DPK.

The proportion of flame retardant E) is generally in the range from 2 to 50 wt %, preferably in the range from 5 to 30 wt % and more preferably in the range from 8 to 25 wt %, based on components B) to H).

Component F

Blowing agents F) which are used for producing the rigid polyurethane foams include preferably water, formic acid and mixtures thereof. These react with isocyanate groups to form carbon dioxide and in the case of formic acid carbon dioxide and carbon monoxide. Since these blowing agents release the gas through a chemical reaction with the isocyanate groups, they are termed chemical blowing agents. In addition, physical blowing agents such as low-boiling hydrocarbons can be used. Suitable in particular are liquids which are inert towards the polyisocyanates A) and have boiling points below 100° C., preferably below 50° C., at atmospheric pressure, so that they vaporize under the conditions of the exothermic polyaddition reaction. Examples of such liquids which can preferably be used are alkanes such as heptane, hexane, n-pentane and isopentane, preferably industrial mixtures of n-pentane and isopentane, n-butane and isobutane and propane, cycloalkanes such as cyclopentane and/or cyclohexane, ethers such as furan, dimethyl ether and diethyl ether, ketones such as acetone and methyl ethyl ketone, alkyl carboxylates such as methyl formate, dimethyl oxalate and ethyl acetate and halogenated hydrocarbons such as methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. Mixtures of these low-boiling liquids with one another and/or with other substituted or unsubstituted hydrocarbons can also be used. Organic carboxylic acids such as formic acid, acetic acid, oxalic acid, ricinoleic acid and carboxyl-containing compounds are also suitable.

It is preferable not to use any halogenated hydrocarbons as blowing agents. It is preferable to use water, formic acid-water mixtures or formic acid as chemical blowing agents and formic acid-water mixtures or formic acid are particularly preferred chemical blowing agents. Pentane isomers or mixtures of pentane isomers are preferably used as physical blowing agents.

The chemical blowing agents can be used alone, i.e., without addition of physical blowing agents, or together with physical blowing agents. Preferably, the chemical blowing agents are used together with physical blowing agents, in which case the use of formic acid-water mixtures or pure formic acid together with pentane isomers or mixtures of pentane isomers is preferred.

The blowing agents are either wholly or partly dissolved in the polyol component (i.e. B+C+D+E+F+G+H) or are introduced via a static mixer immediately before foaming of the polyol component. It is usual for water, formic acid-water mixtures or formic acid to be fully or partially dissolved in the polyol component and the physical blowing agent (for example pentane) and any remainder of the chemical blowing agent to be introduced "on-line".

The polyol component is admixed in situ with pentane, possibly some of the chemical blowing agent and also with all or some of the catalyst. Auxiliary and admixture agents as well as flame retardants are already comprised in the polyol blend.

The amount of blowing agent or blowing agent mixture used is in the range from 1 to 45 wt %, preferably in the range from 1 to 30 wt % and more preferably in the range from 1.5 to 20 wt %, all based on total components B) to H).

When water, formic acid or a formic acid-water mixture is used as blowing agent, it is preferably added to the polyol component (B+C+D+E+F+G+H) in an amount of 0.2 to 10 wt %, based on component B). The addition of water, formic acid or formic acid-water mixture can take place in combination with the use of other blowing agents described. Preference is given to using formic acid or a formic acid-water mixture in combination with pentane.

Component G

Catalysts G) used for preparing the rigid polyurethane foams are particularly compounds which substantially speed up the reaction of the components B) to H) compounds comprising reactive hydrogen atoms, especially hydroxyl groups, with the polyisocyanates A).

It is advantageous to use basic polyurethane catalysts, for example tertiary amines such as triethylamine, tributylamine, dimethylbenzylamine, dicyclohexylmethylamine, dimethylcyclohexylamine, N,N,N',N'-tetramethyldiaminodiethyl ether, bis(dimethylaminopropyl)urea, N-methylmorpholine or N-ethylmorpholine, N-cyclohexylmorpholine, N,N,N',N'-tetramethylethylenediamine, N,N,N,N-tetramethylbutanediamine, N,N,N,N-tetramethylhexane-1,6-diamine, pentamethyldiethylenetriamine, bis(2-dimethylaminoethyl) ether, dimethylpiperazine, N-dimethylaminoethylpiperidine, 1,2-dimethylimidazole, 1-azabicyclo[2.2.0]octane, 1,4-diazabicyclo[2.2.2]octane (Dabco) and alkanolamine compounds, such as triethanolamine, triisopropanolamine, N-methyldiethanolamine and N-ethyldiethanolamine, dimethylaminoethanol, 2-(N,N-dimethylaminoethoxy)ethanol, N,N',N"-tris(dialkylaminoalkyl)hexahydrotriazines, e.g. N,N',N"-tris(dimethylaminopropyl)-s-hexahydrotriazine, and triethylenediamine. However, metal salts such as iron(II) chloride, zinc chloride, lead octoate and preferably tin salts such as tin dioctoate, tin diethylhexoate and dibutyltin dilaurate and also, in particular, mixtures of tertiary amines and organic tin salts are also suitable.

Further possible catalysts are: amidines such as 2,3-dimethyl-3,4,5,6-tetrahydropyrimidine, tetraalkylammonium hydroxides such as tetramethylammonium hydroxide, alkali metal hydroxides such as sodium hydroxide and alkali metal alkoxides such as sodium methoxide and potassium isopropoxide, alkali metal carboxylates and also alkali metal salts of long-chain fatty acids having from 10 to 20 carbon atoms and optionally lateral OH groups. Preference is given to using from 0.001 to 10 parts by weight of catalyst or catalyst combination, based (i.e., reckoned) on 100 parts by weight of component B). It is also possible to allow the reactions to proceed without catalysis. In this case, the catalytic activity of amine-started polyols is exploited.

When, during foaming, a relatively large polyisocyanate excess is used, further suitable catalysts for the trimerization reaction of the excess NCO groups with one another are: catalysts which form isocyanurate groups, for example ammonium ion salts or alkali metal salts, specifically ammonium or alkali metal carboxylates, either alone or in combination with tertiary amines. Isocyanurate formation leads to flame-resistant PIR foams which are preferably used in industrial rigid foam, for example in building and construction as insulation boards or sandwich elements.

Further information regarding the abovementioned and further starting materials may be found in the technical literature, for example Kunststoffhandbuch, Volume VII, Polyurethane, Carl Hanser Verlag Munich, Vienna, 1st, 2nd and 3rd Editions 1966, 1983 and 1993.

Component H

Further auxiliaries and/or admixture agents H) can optionally be added to the reaction mixture for producing the rigid polyurethane foams. Mention may be made of, for example, surface-active substances, foam stabilizers, cell regulators, fillers, dyes, pigments, hydrolysis inhibitors, fungistatic and bacteriostatic substances.

Possible surface-active substances are, for example, compounds which serve to aid homogenization of the starting materials and may also be suitable for regulating the cell structure of the polymers. Mention may be made of, for example, emulsifiers such as the sodium salts of castor oil sulfates or of fatty acids and also salts of fatty acids with amines, e.g. diethylamine oleate, diethanolamine stearate, diethanolamine ricinoleate, salts of sulfonic acids, e.g. alkali metal or ammonium salts of dodecylbenzenedisulfonic or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators such as paraffins, fatty alcohols and dimethylpolysiloxanes. Oligomeric acrylates having polyoxyalkylene and fluoroalkane radicals as side groups are also suitable for improving the emulsifying action, the cell structure and/or for stabilizing the foam. The surface-active substances are usually employed in amounts of from 0.01 to 10 parts by weight, based (i.e., reckoned) on 100 parts by weight of component B).

For the purposes of the present invention, fillers, in particular reinforcing fillers, are the customary organic and inorganic fillers, reinforcing materials, weighting agents, agents for improving the abrasion behavior in paints, coating compositions, etc., which are known per se. Specific examples are: inorganic fillers such as siliceous minerals, for example sheet silicates such as antigorite, serpentine, hornblendes, amphiboles, chrisotile and talc, metal oxides such as kaolin, aluminum oxides, titanium oxides and iron oxides, metal salts, such as chalk, barite and inorganic pigments such as cadmium sulfide and zinc sulfide and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various length, which may be coated with a size. Possible organic fillers are, for example: carbon, melamine, rosin, cyclopentadienyl resins and graft polymers and also cellulose fibers, polyamide, polyacrylonitrile, polyurethane, polyester fibers based on aromatic and/or aliphatic dicarboxylic esters and in particular carbon fibers.

The inorganic and organic fillers can be used individually or as mixtures and are advantageously added to the reaction mixture in amounts of from 0.5 to 50 wt %, preferably from 1 to 40 wt %, based on the weight of components A) to H), although the content of mats, nonwovens and woven fabrics of natural and synthetic fibers can reach values of up to 80 wt %, based on the weight of components A) to H).

Further information regarding the abovementioned other customary auxiliary and admixture agents may be found in the technical literature, for example the monograph by J. H. Saunders and K. C. Frisch "High Polymers" Volume XVI, Polyurethanes, Parts 1 and 2, Interscience Publishers 1962 and 1964, or Kunststoff-Handbuch, Polyurethane, Volume VII, Hanser-Verlag, Munich, Vienna, 1st and 2nd Editions, 1966 and 1983.

The present invention further provides a polyol component comprising:
10 to 90 wt % of polyetherester polyols B),
0 to 60 wt % of further polyester polyols C),
0.1 to 11 wt % of polyether polyols D),
2 to 50 wt % of flame retardants E),
1 to 45 wt % of blowing agents F),
0.5 to 10 wt % of catalysts G), and
0.5 to 20 wt % of further auxiliary and admixture agents H),
all as defined above and all based on the total weight of components B) to H), wherein the wt % add up to 100 wt %, and wherein the mass ratio of total components B) and C) to component D) is at least 7.

It is particularly preferable for the polyol component to comprise
50 to 90 wt % of polyetherester polyols B),
0 to 20 wt % of further polyester polyols C),
2 to 9 wt % of polyether polyols D),
5 to 30 wt % of flame retardants E),
1 to 30 wt % of blowing agents F),
0.5 to 10 wt % of catalysts G), and
0.5 to 20 wt % of further auxiliary and admixture agents H),
all as defined above and all based on the total weight of components B) to H), wherein the wt % add up to 100 wt %, and wherein the mass ratio of total components B) and C) to component D) is at least 7.5.

The mass ratio of the present invention of total components B) and optionally C) to component D) in the polyol components of the present invention is further preferably less than 80, more preferably less than 40, even more preferably less than 30, yet even more preferably less than 20, yet still even more preferably less than 16 and most preferably less than 14.

To produce the rigid polyurethane foams of the invention, the optionally modified organic polyisocyanates A), the specific polyetherester polyols B) of the invention, optionally the further polyester polyols C), the polyetherols D) and the further components E) to H) are mixed in such amounts that the equivalence ratio of NCO groups of the polyisocyanates A) to the sum of the reactive hydrogen atoms of the components B) and optionally C) and D) to H) is 1-6:1, preferably 1.6-5:1 and in particular 2.5-3.5:1.

The examples which follow illustrate the invention.

EXAMPLES

The hereinbelow specified polyester polyols (polyesterols 1 and 3) and polyetherester polyols (polyesterol 2 and polyesterol 4) were used.

Polyesterol 1 (comparator): Esterification product of 34 mol % of terephthalic acid, 9 mol % of oleic acid, 40 mol % of diethylene glycol and 17 mol % of glycerol with a hydroxyl functionality of 2.33, a hydroxyl number of 244 mg KOH/g and an oleic acid content of 20.3 wt % in the polyesterol.

Polyesterol 2 (invention): Esterification product of 31 mol % of terephthalic acid, 8 mol % of oleic acid, 43 mol % of diethylene glycol and 18 mol % of a polyether based on glycerol and ethylene oxide having an OH functionality of 3 and a hydroxyl number of 535 mg KOH/g. The polyester has a hydroxyl functionality of 2.31, a hydroxyl number of 238 mg KOH/g and an oleic acid content of 14.7 wt % in the polyesterol.

Polyesterol 3 (comparator): Esterification product of 30.5 mol % of phthalic anhydride, 12 mol % of oleic acid, 39.5 mol % of diethylene glycol and 18 mol % of trimethylolpropane with a hydroxyl functionality of 2.22, a hydroxyl number of 247 mg KOH/g and an oleic acid content of 24.9 wt % in the polyesterol.

Polyesterol 4 (invention): Esterification product of 25 mol % of phthalic anhydride, 15 mol % of oleic acid, 37 mol % of diethylene glycol and 23 mol % of a polyether based on trimethylolpropane and ethylene oxide having an OH functionality of 3 and a hydroxyl number of 610 mg KOH/g. The polyester has a hydroxyl functionality of 2.22, a hydroxyl number of 244 mg KOH/g and an oleic acid content of 24.5 wt % in the polyesterol.

Determination of Curing and Brittleness of the Rigid Polyurethane Foam

The curing was determined by the bolt test. For this purpose, 2.5, 3, 4, 5, 6 and 7 minutes after mixing of the components of the polyurethane foam in a polystyrene beaker, a steel bolt with a spherical cap 10 mm in radius was pressed by a tensile/compressive tester 10 mm deep into the mushroom-shaped foam formed. The maximum force in N required here is a measure of the curing of the foam.

Brittleness was determined for the rigid polyisocyanurate foam by determining the time at which the surface of the rigid foam displayed visible zones of breakage in the bolt test. Brittleness was further determined subjectively directly after foaming by compressing the foam, and graded on a scale from 1 to 6, where 1 denotes a scarcely brittle foam and 6 a foam of high brittleness.

Determining the Self-Reactivity of the Polyurethane Systems

The polyurethane systems described hereinbelow were adjusted to a unitary fiber time by varying the polyurethane catalyst concentration. When a system needed a lower concentration of catalyst, this was taken to mean that the system had higher self-reactivity.

Inventive Examples 1 and 2 and Comparative Examples 1 and 2

Production of Rigid Polyurethane Foams (Variant 1)

The isocyanates and also the isocyanate-reactive components were foamed up together with the blowing agents, catalysts and all further admixture agents at a constant polyol: isocyanate mixing ratio of 100:190.

Polyol Component:

79 parts by weight of polyesterol as per inventive or comparative examples, 6 parts by weight of polyetherol from ethoxylated ethylene glycol having a hydroxyl functionality of 2 and a hydroxyl number of 190 mg KOH/g, 13 parts by weight of trischloroisopropyl phosphate (TCPP) as flame retardant, 2.0 parts by weight of Tegostab B8443 (silicone-containing) stabilizer.

Admixture Agents:

15.0 parts by weight of S 80:20 pentane (consisting of 80 wt % n-pentane and 20 wt % isopentane), about 1.9 parts by weight of water, 1.6 parts by weight of potassium acetate solution (47 wt % in ethylene glycol), plus bis(2-dimethylaminoethyl) ether solution (70 wt % in dipropylene glycol) for adjusting the fiber times, also called catalyst 1 hereinbelow.

Isocyanate Component:

190 parts by weight of Lupranat® M50 (polymeric methylene(diphenyl diisocyanate) (PMDI), having a viscosity of about 500 mPa*s at 25° C. from BASF SE).

The components were intensively mixed using a laboratory stirrer. Foam density was adjusted to 32+/−1 g/L by varying the water content while keeping the amount of pentane constant at 15.0 parts. Fiber time was further adjusted to 49+/−1 s by varying the proportion of bis(2-dimethylaminoethyl) ether solution (70 wt % in dipropylene glycol) (catalyst 1).

The results are summarized in table 1.

TABLE 1

|  | Polyesterol 1 | Polyesterol 2 | Polyesterol 3 | Polyesterol 4 |
|---|---|---|---|---|
| curing |  |  |  |  |
| 2.5 min | 36 | 39 | 32 | 35 |
| 3 min | 47 | 47 | 39 | 42 |
| 4 min | 66 | 63 | 57 | 56 |
| sum (2.5; 3 and 4 min) | 149 | 149 | 128 | 133 |
| brittleness (subjective) | 6 | 2.5 | 6 | 2 |
| breakage in bolt test | 3 min | no breakage | 2.5 min | no breakage |
| catalyst 1 | 1 | 0.4 | 0.9 | 0.6 |

It is clearly apparent here that inventive polyester polyols 2 and 4 reduce the brittleness of the insulant and increase the self-reactivity of the systems without having any adverse effect on foam curing.

Inventive Examples 3 and 4 and Comparative Examples 3 and 4

Production of Rigid Polyurethane Foams (Variant 2)

Foaming was done similarly to variant 1 except that the chemical blowing agent water used in variant 1 was replaced in variant 2 by formic acid solution (85 wt % in water) as chemical blowing agent.

The components were intensively mixed using a laboratory stirrer. Foam density was adjusted to 32+/−1 g/L by varying the amount of formic acid solution (85 wt % in water) while keeping the pentane content constant at 15.0 parts. Fiber time was further adjusted to 51+/−1 s by varying the proportion of bis(2-dimethylaminoethyl) ether solution (70 wt % in dipropylene glycol; (catalyst 1)).

The results are summarized in table 2.

TABLE 2

|  | Polyesterol 1 | Polyesterol 2 | Polyesterol 3 | Polyesterol 4 |
|---|---|---|---|---|
| curing |  |  |  |  |
| 2.5 min | 28 | 34 | 24 | 31 |
| 3 min | 36 | 42 | 31 | 38 |
| 4 min | 55 | 56 | 46 | 50 |
| sum (2.5; 3 and 4 min) | 119 | 132 | 101 | 119 |
| brittleness (subjective) | 6 | 4.5 | 6 | 3 |
| breakage in bolt test | 2.5 min | 4 min | 3 min | 5 min |
| catalyst 1 | 3.2 | 1.6 | 2.7 | 2.2 |

It is clearly apparent here that inventive polyesterols 2 and 4 reduce the brittleness of the insulant and increase the self-reactivity of the systems without having any adverse effect on foam curing.

I claim:

1. A process for producing rigid polyurethane foams by reaction of
   A) at least one polyisocyanate,
   B) at least one polyetherester polyol obtainable by esterification of
      b1) 10 to 70 mol % of a dicarboxylic acid composition comprising
      b11) 100 mol %, based on the dicarboxylic acid composition, of one or more aromatic dicarboxylic acids or derivatives thereof,
      b2) 2 to 30 mol % of one or more fatty acids or fatty acid derivatives,
      b3) 10 to 70 mol % of one or more aliphatic or cycloaliphatic diols having 2 to 18 carbon atoms or alkoxylates thereof,
      b4) 2 to 50 mol % of a polyether polyol having a functionality of greater than 2 and not more than 4, and an OH value in the range of 300 to 1250, prepared by ethoxylating a polyol having a functionality of above 2,
      all based on the total amount of components b1) to b4), wherein said components b1) to b4) sum to 100 mol %,
   C) optionally one or more further polyester polyols other than those of component B),
   D) at least one polyetherol polyol selected from the group consisting of polyoxyethylene polyols,
   E) optionally one or more flame retardants,
   F) one or more blowing agents,
   G) one or more catalysts, and
   H) optionally one or more further auxiliaries or admixture agents,
   wherein the mass ratio of total components B) and optionally C) to component D) is at least 7.

2. The process according to claim 1 wherein the mass ratio of polyetherester polyols B) to the further polyester polyols C), which are different from those of component B), is at least 0.1.

3. The process according to claim 1 wherein no further polyester polyols C) are utilized.

4. The process according to claim 1 wherein said polyether alcohol b4) is prepared by ethoxylating a polyol selected from the group consisting of sorbitol, pentaerythritol, trimethylolpropane, glycerol, polyglycerol and mixtures thereof.

5. The process according to claim 1 wherein said component b11) comprises one or more compounds selected from the group consisting of terephthalic acid, dimethyl terephthalate, polyethylene terephthalate, phthalic acid, phthalic anhydride and isophthalic acid.

6. The process according to claim 1 wherein said fatty acid or fatty acid derivative b2) is selected from the group consisting of castor oil, polyhydroxy fatty acids, ricinoleic acid, hydroxyl-modified oils, grapeseed oil, black cumin oil, pumpkin kernel oil, borage seed oil, soybean oil, wheat germ oil, rapeseed oil, sunflower seed oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, and fatty acids, hydroxyl-modified fatty acids and fatty acid esters based on myristoleic acid, palmitoleic acid, oleic acid, vaccenic acid, petroselic acid, gadoleic acid, erucic acid, nervonic acid, linoleic acid, α- and γ-linolenic acid, stearidonic acid, arachidonic acid, timnodonic acid, clupanodonic acid and cervonic acid.

7. The process according to claim 6 wherein said fatty acid or fatty acid derivative b2) is selected from the group consisting of oleic acid and methyl oleate.

8. The process according to claim 1 wherein said aliphatic or cycloaliphatic diols b3) are selected from the group consisting of ethylene glycol, diethylene glycol, propylene glycol, 1,3-propanediol, 1,4-butanediol, 1,5-pentanediol, 1,6-hexanediol, 2-methyl-1,3-propanediol and 3-methyl-1,5-pentanediol and alkoxylates thereof.

9. A rigid polyurethane foam obtainable from the process according to claim 1.

10. A sandwich element having rigid or flexible outer layers comprising the rigid polyurethane foam according to claim 9.

11. A polyol component for producing rigid polyurethane foams comprising 10 to 90 wt % of at least one polyetherester polyol B), 0 to 60 wt % of one or more further polyester polyols C) other than those of component B), 0.1 to 11 wt % of one or more polyether polyols D) selected from the group consisting of polyoxyethylene polyols, 2 to 50 wt % of one or more flame retardants E), 1 to 45 wt % of one or more blowing agents F), 0.5 to 10 wt % of one or more catalysts G), 0.5 to 20 wt % of one or more further auxiliary and admixture agents H), wherein the mass ratio of total components B) and C) to component D) is at least 7, wherein B) is at least one polyetherester polyol obtainable by esterification of b1) 10 to 70 mol % of a dicarboxylic acid composition comprising b11) 100 mol %, based on the dicarboxylic acid composition, of one or more aromatic dicarboxylic acids or derivatives thereof, b2) 2 to 30 mol % of one or more fatty acids or fatty acid derivatives, b3) 10 to 70 mol % of one or more aliphatic or cycloaliphatic diols having 2 to 18 carbon atoms or alkoxylates thereof, b4) 2 to 50 mol % of a polyether polyol having a functionality of greater than 2 and not more than 4, and an OH value in the range of 300 to 1250, prepared by ethoxylating a polyol having a functionality of above 2, all based on the total amount of components b1) to b4), wherein said components b1) to b4) sum to 100 mol %.

12. The process according to claim 1 wherein component D) is a polyethylene glycol.

13. The process according to claim 1 wherein the mass ratio of total components B) and optionally C) to component D) is at least 7.5.

14. The process according to claim 1 wherein the mass ratio of total components B) and optionally C) to component D) is at least 8.

15. The process according to claim 1 wherein the mass ratio of total components B) and optionally C) to component D) is at least 10.

16. The process according to claim 1 wherein the mass ratio of total components B) and optionally C) to component D) is at least 12.

* * * * *